United States Patent [19]

Stampfli et al.

[11] Patent Number: 5,022,795
[45] Date of Patent: Jun. 11, 1991

[54] CUTTING ROTOR

[75] Inventors: Peter Stampfli, Walliswil - bei Bipp; Peter Frey, Schüpfen, both of Switzerland

[73] Assignee: Krupp Widia (Schweiz) AG, Biel, Switzerland

[21] Appl. No.: 396,335

[22] Filed: Aug. 21, 1989

[30] Foreign Application Priority Data

Feb. 9, 1988 [CH] Switzerland .................. 03297/88

[51] Int. Cl.$^5$ .................................................. B23C 5/24
[52] U.S. Cl. .................................... 407/47; 407/40
[58] Field of Search .................. 407/35, 40, 41, 43, 407/46, 47, 48, 49, 50

[56] References Cited

U.S. PATENT DOCUMENTS 1,700,333  1/1929  Pond ........................... 407/40
3,887,975  6/1975  Sorice et al. .................. 407/47
4,400,117  8/1983  Smith ........................... 407/49

Primary Examiner—Frederick R. Schmidt
Assistant Examiner—Jack Lavinder
Attorney, Agent, or Firm—Marks Murase & White

[57] ABSTRACT

Hard metal cutting blades are inserted into grooves of the rotor body. Each cutting blade is provided at both ends thereof with a cylindrical or conical clamping surface, to which a conical surface of a conical screw is applied which clamps the blade within the groove by a clamping force. The cutting blades are thus securely held in a definite position not only radially and circumferentially, but also axially. The shape of the cutting blades and the grooves as well as the clamping means, having the shape of conical screws, are simple and unexpensive, and their handling is simple. A soiling of the cutting blade clampings is virtually excluded.

11 Claims, 1 Drawing Sheet

CUTTING ROTOR

BACKGROUND OF THE INVENTION

The present invention is related to a cutting rotor having blades clamped within grooves of the rotor body.

Such a rotor for the use in an extrusion granulator is known from the prospectus *WIDIA-SCHNEIDRO-TOR* of the Applicant, the blades being held in grooves one side wall of which is deformed by eccenters and pressed against one side of the blade portion engaging the groove. In this case, however, secure clamping of the blades is only achieved if the portion of the blade projecting into the groove, respectively the groove itself, is somewhat tapered towards the interior. Although this fixation is generally satisfactory, it has certain drawbacks.

It is also known to tighten the cutting blades to the rotor body by means of screws having conical heads (DE-A-2,120,491). In this case, only the direct screw forces can be used for the fixation. It is further known to fasten an insert tool by means of a screw having a conical head which acts onto an inclined surface of the insert tool by means of a rolling member (DE-A-3,511,580). However, this solution is expensive, space-consuming, and therefore not suitable for a cutting rotor.

SUMMARY OF THE INVENTION

It is an object of the present invention to improve the clamping of the blade under simple manufacturing conditions. This object is attained, according to this invention, by the fact that each cutting blade is provided with at least one concave clamping surface against which a conical screw of a clamping element is applied. The axis of the conical screw is at least approximately parallel to the lengthwise direction of the cutting blade. The conical screw has a conical head which eccentrically abuts against said clamping surface. The clamping force thus has a radial and an axial component both acting upon the cutting blade. The said cone may now act onto the concave clamping surface in the radial and axial directions at the same time, whereby a secure, solid and precise clamping of the blade in any direction is achieved. It will be possible to adjust the axial position of the blade with precision within certain limits as well. In practice, there is no risk of soiling or sticking.

BRIEF DESCRIPTION OF THE DRAWINGS

The invention will now be described in more detail by means of one embodiment and a variant thereof, with reference to the drawing wherein.

DETAILED DESCRIPTION OF THE INVENTION

Figure 1:
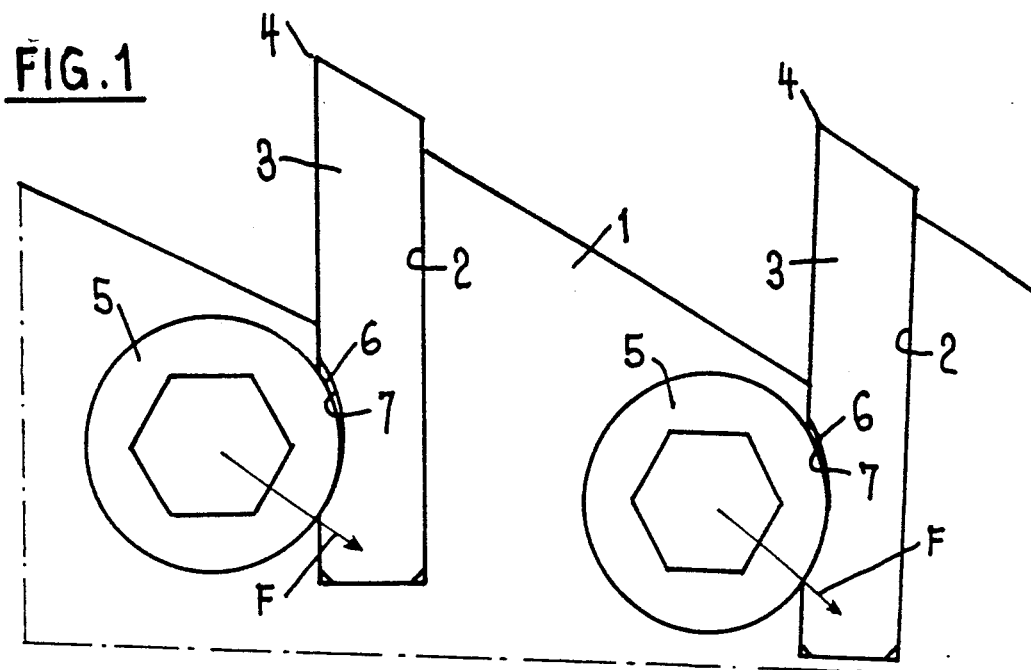
FIG. 1 is a partial front view of the cutting rotor.
Figure 2:
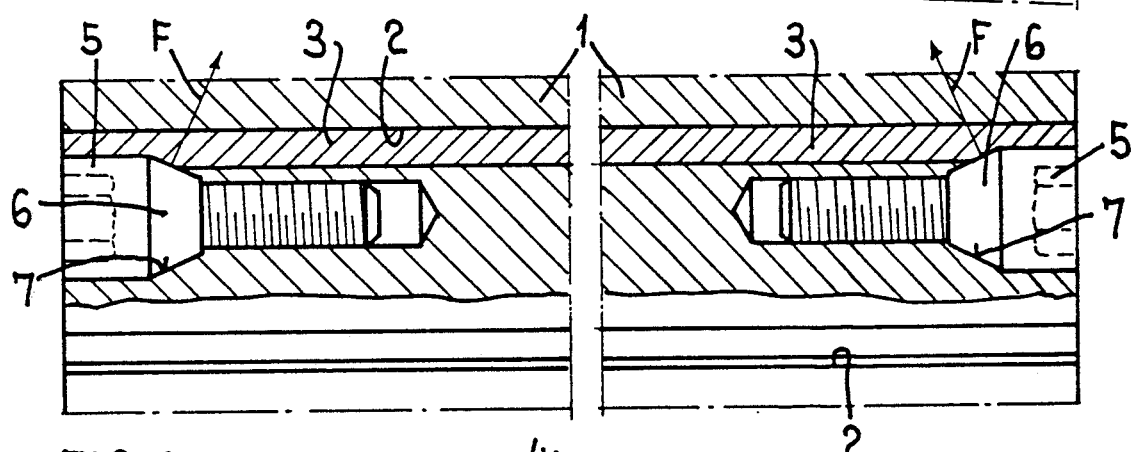
FIG. 2 is a partly sectioned side view.

FIG. 1 shows a small section of the circumference of the cutting rotor. Prismatic grooves 2 are milled into the circumference of the rotor body 1 with distances as small as e.g. 17 to 20 mm, each groove receiving a blade 3 having a cutting edge 4. On both front faces of the rotor, a clamping screw 5 is assigned to each blade 3, only their heads being visible in FIG. 1. As shown in FIG. 2, these clamping screws 5 which are fastened to the rotor body 1 are provided with a conical clamping surface 6 which cooperates with an adjoining concave clamping surface 7 on the blade 3. Thus, every blade 3 is provided at its both ends with a corresponding concave clamping surface 7 to which abuts the cone of a clamping screw 5. The clamping surfaces 7 may be cylindrical, whose inclination corresponds to the angle of inclination of the cone 6, so that each cone 6 is at rest on the clamping surface 7 along a generating line. As shown in FIG. 1, the conical surfaces 6 are slightly eccentric with reference to the clamping surfaces 7 of the blades 3 when they are mounted. It is contemplated in FIG. 1 that this contact generating line is situated e.g. in the left hand lateral surface of the blade 3, so that the clamping force F applied to the clamping surface 7 by the clamping cone 6 has about the direction represented in FIG. 1. When one of the conical screws 5 visible in FIG. 1 is tightened, the friction force applied by its conical surface 6 to the adjoining clamping surface 7 essentially acts radially inwards and supports the wedge effect in the desired sense. The conical screws on the opposite, rear face of the rotor have to be provided with left-hand threads in order to produce the same effect. This clamping force, however, has also a component in the lengthwise direction of the blade, i.e. in the axial direction of the blades 3, as indicated in FIG. 2. Thus, the blades are held in a definite position by the conical screws 5 since they are pressed, with their precision-machined surfaces, in the circumferential direction and, to the right as seen in FIG. 1, and also inwardly, against the groove walls and the groove bottom respectively. Additionally, they are axially secured because the conical screws prevent any axial displacement as well. The blades 3 are seated in the grooves 2 practically without any clearance, so that no dirt can penetrate into the rotor circumference. Therefore, it is virtually excluded that the clamping elements be soiled in any way that would impair the unclamping and dismounting of the blades for replacement.

The blades 3 are preferably made of a hard metal, in particular a hard metal with nickel or a nickel alloy such as nickel-chromium, nickel-molybdenum or nickel-titanium as a binder metal. The clamping surfaces 7 of the blades need not be of very high precision for it is not very critical in which direction the clamping force F exactly acts. However, it is important for the surfaces to be precise enough in order to guarantee a uniform mutual contact of the conical surfaces 6 with the clamping surfaces along a generating line so that no overstressing of the hard metal blade can occur. The precision of the clamping surfaces 7 obtained by sintering of the hard metal blades, however, is normally quite sufficient, i.e. finishing these clamping surfaces is not necessary. Therefore, the manufacture of the blades is not rendered substantially more expensive by the clamping surfaces 7, and furthermore, the shape of the blade is very simple, the long sides allowing a plane parallel grinding with a working overmeasure of e.g. 0.2 mm. A particular advantage of the represented embodiment consists in the possibility to precisely adjust the axial position of the blade by measured tightening of the two conical screws 6 assigned to each single blade 3.

Figure 3:
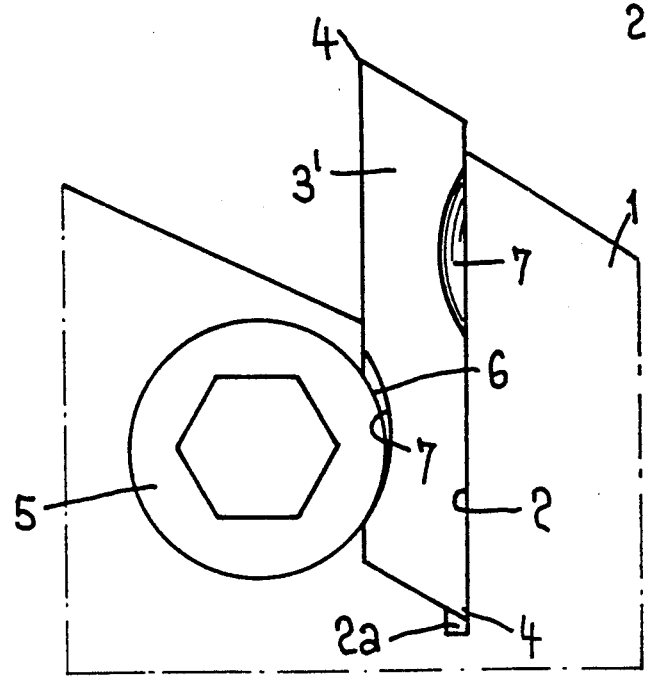
FIG. 3 is a partial front view, corresponding to FIG. 1, of an alternative embodiment.

In FIG. 3, which shows an alternative embodiment, corresponding parts are referenced as in FIG. 1. The difference is that in contrast to the embodiment according to FIG. 1, reversible blades 3' are provided. They have a symmetrical cross section with two cutting edges 4. In this case, the grooves 2 have a different cross section, the groove bottom being inclined according to the flank of the blade. The groove 2 is provided with a recess 2a in the region of the inside cutting edge 4 of the blade 3' in order to assure that the cutting edge 4 remains undamaged in any case. The reversible blade is provided on both ends 2 with symmetrical clamping surfaces 7. When the outside cutting edge 4 is worn, the blade 3' may be removed, reversed, and inserted again.

What is claimed is:

1. A cutting rotor having cutting blades clamped in grooves of a rotor body, wherein each cutting blade has a longitudinal axis and is provided with at least one concave clamping surface against which a conical screw of a clamping element is applied, the axis of said conical screw being generally parallel to the longitudinal axis of the cutting blade, the conical screw having a conical head which eccentrically abuts to said clamping surface, the clamping force having a radial and an axial component acting upon the cutting blade, wherein each cutting blade has opposed longitudinal ends and wherein a conical screw is provided at each longitudinal end to clamp the blade to the rotor body and said conical screws allowing radial clamping and fine axial adjustment of said cutting blade.

2. The cutting rotor according to claim 1, wherein the axis of the cone is parallel to the axis of the rotor body.

3. The cutting rotor according to claim 1 or 2, wherein a conical screw is tightened against each end of the cutting blade.

4. The cutting rotor according to claim 1 or 2 wherein hard metal cutting blades comprising nickel, nickel-chromium, nickel-molybdenum or nickel-titanium as a binder metal are provided.

5. The cutting rotor according to claim 1 or 2 wherein reversible cutting blades having symmetrically disposed cutting edges and clamping surfaces are provided.

6. The cutting rotor according to claim 1 or 2 wherein each cutting blade has a conical clamping surface, said cone being applied to the clamping surface on a generating line thereof.

7. The cutting rotor according to claim 1 or 2, wherein said clamping surfaces are unfinished surfaces of hard metal cutting blades.

8. The cutting rotor according to claim 1 or 2 wherein each cutting blade has a cylindrical clamping surface, said cone being applied to the clamping surface on a generating line thereof.

9. A cutting rotor comprising:
a rotor body with a plurality of grooves formed therein;
a plurality of cutting blades, each cutting blade having a longitudinal axis and being provided with at least one concave surface extending parallel to the longitudinal axis of the cutting blade;
and a plurality of clamping elements clamping the cutting blades in the grooves, each clamping element including a conical clamping surfaces having an axis which is parallel to the longitudinal axis of the cutting blade, and a threaded portion, the threaded portion being threadable into the rotor body so that the conical clamping surface of the clamping element eccentrically abuts the clamping surface of the cutting surface of the cutting blade so as to provide a radial clamping force and an axial clamping force for clamping the blades into the grooves, wherein each cutting blade has opposed longitudinal ends and wherein a conical screw is provided at each longitudinal end to clamp to blade to the rotor body and said conical screws allowing radial clamping and fine axial adjustment of said cutting blade.

10. The cutting rotor of claim 9, wherein each cutting blade is clamped to the rotor body by two clamping elements, one at each longitudinal end of the cutting blade and wherein the threaded portions of the two clamping elements are oppositely threaded so that the clamping force of the two clamping elements acts in a radially inward direction.

11. A cutting rotor having cutting blades clamped in the grooves of a rotor body, wherein each cutting blade has a longitudinal axis and is provided with at least one concave clamping surface at each end, two clamping elements clamping each of the cutting blades into the grooves, the two clamping elements being arranged at opposite longitudinal ends of the cutting blade and each clamping element comprising a conical clamping surface having an axis which is parallel to the longitudinal axis of the cutting blade and a threaded portion, the threaded portion being threadable into the rotor body so that the conical clamping surface of the clamping element eccentrically abuts the clamping surface of the cutting blade so as to provide a radial clamping force and an axial clamping force for clamping the blades into the grooves; whereby clamping in the radial direction and fine adjustment of the cutting blades in the axial direction may be obtained by actuating said screws.

* * * * *